United States Patent
Gschwind et al.

(10) Patent No.: US 11,972,259 B2
(45) Date of Patent: *Apr. 30, 2024

(54) INSTRUCTIONS TO COUNT A NUMBER OF CONTIGUOUS REGISTER ELEMENTS HAVING SPECIFIC VALUES IN A SELECTED LOCATION

(71) Applicant: International Business Machines Corporation, Armonk, NY (US)

(72) Inventors: Michael K. Gschwind, Chappaqua, NY (US); Markus Kaltenbach, Holzgerlingen (DE); Jentje Leenstra, Bondorf (DE); Brett Olsson, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 330 days.

This patent is subject to a terminal disclaimer.

(21) Appl. No.: 16/503,136

(22) Filed: Jul. 3, 2019

(65) Prior Publication Data
US 2019/0324749 A1 Oct. 24, 2019

Related U.S. Application Data

(63) Continuation of application No. 14/748,550, filed on Jun. 24, 2015, now Pat. No. 10,387,150.

(51) Int. Cl.
*G06F 9/30* (2018.01)

(52) U.S. Cl.
CPC ...... *G06F 9/30021* (2013.01); *G06F 9/30018* (2013.01); *G06F 9/30036* (2013.01)

(58) Field of Classification Search
CPC ............ G06F 9/30018; G06F 9/30021; G06F 9/30036; G06F 7/02
See application file for complete search history.

(56) References Cited

U.S. PATENT DOCUMENTS

| 8,601,246 B2* | 12/2013 | Peleg | G06F 9/30025 |
| | | | 712/300 |
| 10,387,150 B2* | 8/2019 | Gschwind | G06F 9/30036 |

(Continued)

OTHER PUBLICATIONS

Codingforspeed.com, "Counting the number of Leading Zeros for a 32-bit Integer (Signed or Unsigned)", Jan. 23, 2014 [retrieved on Feb. 8, 2021], 3 pages, Retrieved from the Internet <URL: https://codingforspeed.com/counting-the-number-of-leading-zeros-for-a-32-bit-integer-signed-or-unsigned/ >.*

(Continued)

*Primary Examiner* — David J. Huisman
(74) *Attorney, Agent, or Firm* — Edward Wixted; Rachel L. Pearlman; Heslin Rothenberg Farley & Mesiti PC

(57) ABSTRACT

A machine instruction to find a condition location within registers, such as vector registers. The machine instruction has associated therewith a register to be examined and a result location. The register includes a plurality of elements. In execution, the machine instruction counts a number of contiguous elements of the plurality of elements of the register having a particular value in a selected location within the contiguous elements. Other locations within the contiguous elements are ignored for the counting. The counting provides a count placed in the result location.

17 Claims, 10 Drawing Sheets

(56) References Cited

U.S. PATENT DOCUMENTS

| | | |
|---|---|---|
| 10,423,412 B2 * | 9/2019 | Gschwind ........... G06F 9/30021 |
| 2012/0079253 A1 * | 3/2012 | Wiedemeier ........ G06F 9/30014 |
| | | 712/222 |
| 2012/0102301 A1 | 4/2012 | Gonion |
| 2013/0246758 A1 | 9/2013 | Bradbury et al. |
| 2014/0189293 A1 | 7/2014 | Gopal et al. |
| 2014/0189309 A1 | 7/2014 | Hughes et al. |
| 2014/0281371 A1 | 9/2014 | Thantry et al. |
| 2014/0281401 A1 | 9/2014 | Hughes et al. |
| 2015/0039851 A1 | 2/2015 | Uliel et al. |
| 2015/0046671 A1 | 2/2015 | Ould-Ahmed-Vall |
| 2016/0378477 A1 | 12/2016 | Gschwind et al. |
| 2016/0378478 A1 | 12/2016 | Gschwind et al. |

OTHER PUBLICATIONS

Mell et al., "The NIST Definition of Cloud Computing," National Institute of Standards and Technology, Information Technology Laboratory, Special Publication 800-145, Sep. 2011, pp. 1-7.

Z/Architecture Principles of Operation, IBM® Publication No. SA22-7832-09, Tenth Edition, Sep. 2012, pp. 1-1568.

List of IBM Patents or Patent Applications Treated as Related, Jul. 23, 2019, 2 pages.

* cited by examiner

VECTOR COUNT LEADING ZERO LSB
VCLZLSB         R₁, R₂, M₃

VECTOR COUNT LEADING ZERO LSB
VCLZLSB         R₁, D₂ (X₂, B₂), M₃

VECTOR COUNT TRAILING ZERO LSB
VCTZLSB         R₁, R₂, M₃

VECTOR COUNT TRAILING ZERO LSB
VCTZLSB         R₁, D₂ (X₂, B₂), M₃

INSTRUCTIONS TO COUNT A NUMBER OF CONTIGUOUS REGISTER ELEMENTS HAVING SPECIFIC VALUES IN A SELECTED LOCATION

BACKGROUND

One or more aspects relate, in general, to processing within a computing environment, and in particular, to the processing of string or array data within the computing environment.

String data is often scanned to find the first occurrence of a specific condition. For example, in a string compare, two strings are compared producing a result. The comparison is, e.g., a sequential comparison of corresponding characters from each string until a mismatched pair of characters is detected. The result of the string compare is the comparison of the mismatched pair of characters (e.g., less than, greater than, equal to). As a particular example, a set of data of a first string is loaded into a first register and a set of data of a second string is loaded into a second register. A compare is performed of the data in the two registers. A check is made as to whether a specific condition exists, such as a miscompare of corresponding characters from the two registers. If not, a status is set indicating that there are no miscompares, and the next sets of data are loaded into the registers and compared until the end of the strings. However, if the specific condition occurs within a set of data, such as a miscompare, then the next step is to determine the location of the condition.

Typically, for each pair of data sets compared, the compare operation produces a result of all zeros for that pair, if the compare indicates a false result, and all ones for the pair, if the compare indicates a true result relative to the predicate being compared. Then, a determination may be desired as to the location of an occurrence of the specific condition within the result, such as the first miscompare.

In making this determination, all the leading zeros in the result are counted until a non-zero value is reached, and that count is used to determine the location of the condition. However, while a hardware implementation of this is tolerable for general purpose registers (e.g., generally 64-bit or narrower), it is not tolerable when scanning larger, wider layouts, such as 128 bit registers, and beyond. This is especially true where the hardware implementation requires those registers to be split into 64 bit halves due to micro-architectural trade-offs and cycle time constraints. In this situation, it becomes difficult to implement such a bit count across the wide layout registers. Thus, this type of counting is not used in certain processing, like Single Instruction, Multiple Data (SIMD) processing of vector registers.

SUMMARY

Based on the foregoing, a need exists for a capability to determine within wide layout registers a first occurrence (or non-occurrence) of a condition, such as a miscompare. A further need exists for a capability to determine within such registers a last occurrence (or non-occurrence) of a condition, such as a miscompare. A need exists for a hardware implementation of a count for leading (or trailing) zeros in wide layout registers to determine the location of a miscompare or compare.

Shortcomings of the prior art are overcome and additional advantages are provided through the provision of a computer program product for executing a machine instruction. The computer program product includes a storage medium readable by a processing circuit and storing instructions for execution by the processing circuit for performing a method. The method includes, for instance, obtaining, by a processor, a machine instruction to be executed. The machine instruction has associated therewith a register to be examined, and a result location to be used for the machine instruction. The register includes a plurality of elements. The machine instruction is executed by the processor, and the executing includes counting a number of contiguous elements of the plurality of elements of the register having a particular value in a selected location within the contiguous elements. Other locations within the contiguous elements are ignored for the counting, and the counting provides a count to be placed in the result location. Advantageously, an instruction is provided that counts contiguous elements in a register having a specified value without needing to count all of the bits of the elements. This provide a more efficient, less complex design providing a count.

As one example, the count indicates a location (e.g., a first location from either the left (leading) or right (trailing)) within the register having a specific condition. One advantage of this aspect is the provision of an instruction to be used to determine the location within a register of a specific condition that is less complex and more efficient by taking advantage of the characteristic of the result of the compare producing an element of all 0s (if false) or all 1s (if true), and thereby, only having to examine one of the bits (e.g., LSB) of each element. In contrast, a true count leading zeros or count trailing zeros operation is required to count every single bit.

In one embodiment, the executing further includes determining whether leading elements of the register or trailing elements of the register are to be counted, and the counting includes counting the number of contiguous leading elements of the register or the number of contiguous trailing elements of the register based on the determining. This advantageously allows, for instance, an implementation for different types of computing environments, including Big-Endian and Little-Endian processors.

As examples, the determining is based on an operation code of the machine instruction or another field of the machine instruction. The operation code defines the operation to be performed in executing the machine instruction. Advantageously, by using the other field, it is selectable, by the value of the field whether leading elements or trailing elements are to be counted.

In one advantageous embodiment, the instruction may be used for different sizes of vector elements. As examples, a size of an element is indicated by a field of the machine instruction. The field of the machine instruction may include an operation code of the machine instruction used to define the operation to be performed in executing the machine instruction or another field of the machine instruction. Optionally, the other field of the machine instruction may include a mask field. The mask field is configured to indicate a plurality of selectable sizes for the plurality of elements of the register. This advantageously permits one instruction to perform counting for vector registers having different element sizes.

In one or more embodiments, the selected location is a least significant bit of an element, and the particular value is a zero. Thus, advantageously, only one bit needs to be examined for each element, instead of a plurality of bits.

Further, in one aspect, the register is a vector register having a wide layout. The wide layout includes, for instance, 128 bits. Thus, the vector register, in one example, has sixteen elements, each element having eight bits. Advantageously, an accurate count is provided for registers having wide layouts, such as vector registers.

In a further aspect, a computer system for executing a machine instruction is provided. The computer system includes, for instance, a memory and a processor in communications with the memory. The computer system is configured to perform a method. The method includes, for instance, obtaining, by the processor, a machine instruction to be executed. The machine instruction has associated therewith a register to be examined and a result location to be used by the machine instruction. The register includes a plurality of elements. Further, the processor executes the machine instruction, and the executing includes counting a number of contiguous elements of the plurality of elements of the register having a particular value in a selected location within the contiguous elements. Other locations within the contiguous elements are ignored for the counting, and the counting provides a count placed in the result location.

In yet another aspect, a computer-implemented method of executing a machine instruction is provided. The computer-implemented method includes, for instance, obtaining, by a processor, a machine instruction to be executed. The machine instruction has associated therewith a register to be examined and a result location to be used by the machine instruction. The register includes a plurality of elements. The method further includes executing, by the processor, the machine instruction. The executing includes counting a number of contiguous elements of the plurality of elements of the register having a particular value in a selected location within the contiguous elements. Other locations within the contiguous elements are ignored for the counting. The counting provides a count placed in the result location.

Computer program products, methods and systems relating to one or more additional aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing, as well as features and advantages of one or more aspects, are apparent from the following detailed description taken in conjunction with the accompanying drawings in which:

DETAILED DESCRIPTION

Figure 1:
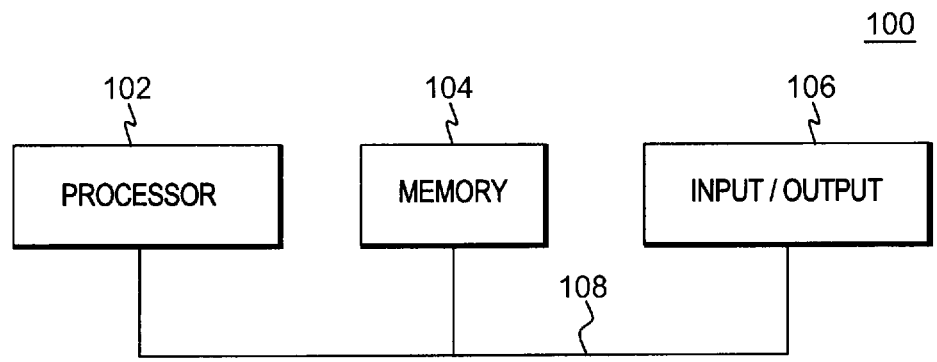
FIG. 1 depicts one example of a computing environment to incorporate and use one or more aspects.

String data is often scanned to find the first occurrence (or non-occurrence) of a specific condition (e.g., a mismatch, match, etc.). As a particular example, characters of a first string of data are loaded into elements of a first register and characters of a second string of data are loaded into elements of a second register. The two registers are then compared, element by element, for a specific predicate (e.g., equal, not equal, greater than, less than, etc.). For each pair of elements compared, the compare operation produces a result of all zeros for that pair of elements, if the predicate compares false, and all ones for that pair of elements, if the predicate compares true. Then, a determination may be made as to the location within the result of the first occurrence of a specific condition, such as a first non-matching pair of elements or a first matching pair of elements, as examples. The predicate in this example is not equal when searching for the first non-matching pair, or equal when searching for the first matching pair.

Conventionally, in making this determination of the location of the specific condition, all of the leading zeros within the result are counted until a non-zero value is reached. That count is then used to find the location of the specific condition. However, while a hardware implementation of this is tolerable for general purpose registers, it is not tolerable when searching larger, wider layouts, such as 128 bit vector registers, and beyond. Thus, this type of counting, and in particular, a hardware implementation of this type of counting, is not used in Single Instruction, Multiple Data processing.

However, in accordance with one or more aspects, a capability is provided to determine the location of the first occurrence (or non-occurrence) of a specific condition, if any, in a string or other data structure being scanned/sorted in a SIMD (Single Instruction, Multiple Data) vector register. For instance, machine instructions are provided that determine the location of the first occurrence (or non-occurrence) of a specific condition in data stored in registers having a wide layout, such as vector registers. In one example, the instructions count the number of contiguous leading (or trailing) elements (e.g., byte elements or elements of other sizes) in a vector register having a zero least significant bit (LSB). Although in the examples herein the location within each element being checked is the least significant bit, in other embodiments another selected location within the elements may be checked. The least significant bit is only one example. Further, although in the examples herein, the value that is checked is a value of zero, in other examples, it may be a value of one or other values. Zero is only one example.

The machine instructions of one or more aspects provide a solution to a problem of being able to determine the location of the first occurrence (or non-occurrence) of a specific condition, if any, in a string or other data structure being scanned/sorted in an SIMD vector register. The solution is able to determine, automatically (i.e., without human intervention), the location of the specific condition without needing (i.e., absent) separate expensive logic, which invariably increases design complexity. Advantageously, the instructions search a vector register to provide a count of specific values, and that count is accurate across an entire vector register. The count indicates the location of a specific condition within a searched component, such as a string or other data, a vector register, etc. This capability improves computer execution, thereby improving computer performance, and is useful in systems having Little- and Big-Endian execution.

One embodiment of a computing environment to incorporate and use one or more aspects is described with reference to FIG. 1. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one embodiment, processor 102 is based on the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE® is a registered trademark of International Business Machines Corporation, Armonk, N.Y., USA. Other names used herein may be registered trademarks, trademarks, or product names of International Business Machines Corporation or other companies.

In another example, processor 102 is based on the z/Architecture offered by International Business Machines Corporation, and is part of a server, such as the System z server, which implements the z/Architecture and is also offered by International Business Machines Corporation. One embodiment of the z/Architecture is described in an IBM® publication entitled, "z/Architecture Principles of Operation," IBM® Publication No. SA22-7832-10, Eleventh Edition, March 2015, which is hereby incorporated herein by reference in its entirety. In one example, the processor executes an operating system, such as z/OS, also offered by International Business Machines Corporation. IBM®, Z/ARCHITECTURE® and Z/OS® are registered trademarks of International Business Machines Corporation.

In yet a further embodiment, processor 102 is based on an Intel architecture offered by Intel Corporation. Intel® is a registered trademark of Intel Corporation, Santa Clara, Calif. Yet further, processor 102 may be based on other architectures. The architectures mentioned herein are merely provided as examples.

Figure 2A:
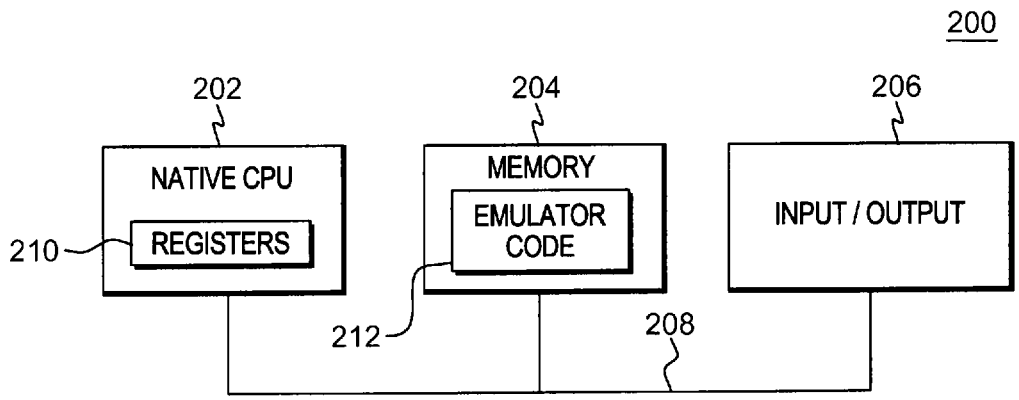
FIG. 2A depicts another example of a computing environment to incorporate and use one or more aspects.

Another embodiment of a computing environment to incorporate and use one or more aspects is described with reference to FIG. 2A. In this example, a computing environment 200 includes, for instance, a native central processing unit 202, a memory 204, and one or more input/output devices and/or interfaces 206 coupled to one another via, for example, one or more buses 208 and/or other connections. As examples, computing environment 200 may include a PowerPC processor, a zSeries server, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the Power architecture, such as zSeries servers, pSeries servers, HP Superdome servers or others, to emulate the Power architecture and to execute software and instructions developed based on the Power architecture. In a further example, emulator code 212 allows machines based on architectures other than the z/Architecture, such as PowerPC processors, pSeries servers, HP Superdome servers or others, to emulate the z/Architecture and to execute software and instructions developed based on the z/Architecture. Other architectures may also be emulated.

Figure 2B:
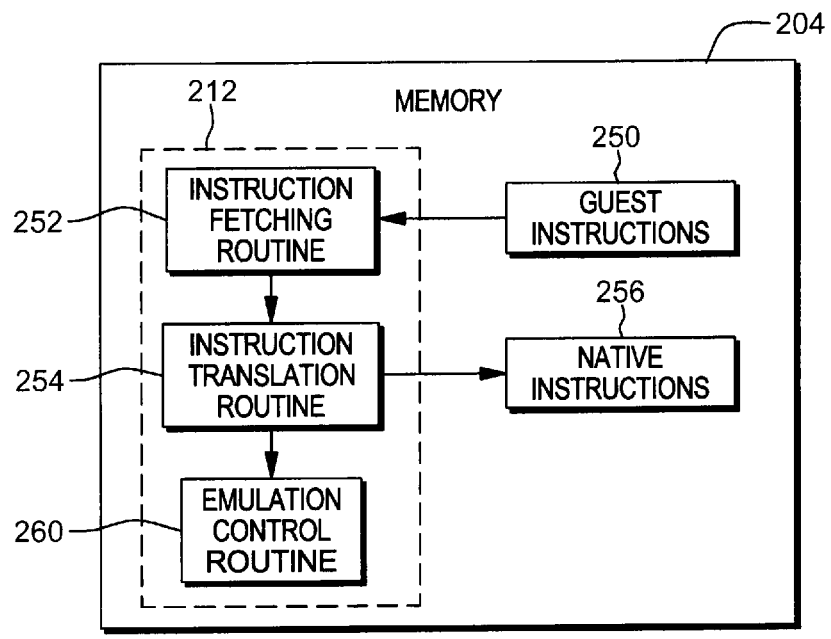
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a PowerPC processor or a z/Architecture processor 102, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 250 that is obtained, translated and executed is an instruction described herein. The instruction, which is of one architecture (e.g., the Power architecture or z/Architecture) is fetched from memory, translated and represented as a sequence of native instructions 256 of another architecture (e.g., the z/Architecture, Power architecture, Intel architecture, etc.). These native instructions are then executed.

In one embodiment, the instructions described herein are vector instructions, which are part of a vector facility. The vector facility provides, for instance, fixed sized vectors ranging from one to sixteen elements. Each vector includes data which is operated on by vector instructions defined in the facility. In one embodiment, if a vector is made up of multiple elements, then each element is processed in parallel with the other elements. Instruction completion does not occur until processing of all the elements is complete. In other embodiments, the elements are processed partially in parallel and/or sequentially.

Vector instructions can be implemented as part of various architectures, including, but not limited to, the Power architecture, z/Architecture, x86, IA-32, IA-64, etc. Although embodiments described herein are for the Power architecture and z/Architecture, the vector instructions described herein and/or one or more other aspects may be based on many other architectures. The Power architecture and z/Architecture are only provided as examples.

Figure 3:
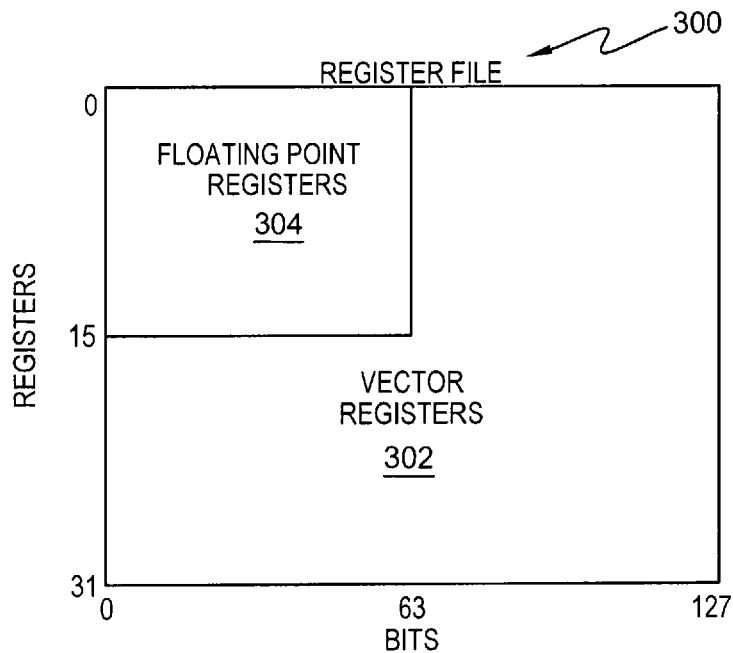
FIG. 3 depicts one example of a register file.

In one embodiment, there are 32 vector registers and other types of registers can map to a quadrant of the vector registers. For instance, as shown in FIG. 3, a register file 300 includes 32 vector registers 302 (registers 0-31) and each register is 128 bits in length (bits 0-127). Sixteen floating point registers 304, which are 64 bits in length, can overlay the vector registers. Thus, as an example, when floating point register 2 is modified, then vector register 2 is also modified. Other mappings for other types of registers are also possible.

Vector data may appear in storage in, for instance, a left-to-right sequence, similar to other data formats in, for instance, Big-Endian storage. Bits of a data format that are numbered 0-7 constitute the byte in the leftmost (lowest-numbered) byte location in storage, bits 8-15 form the byte in the next sequential location, and so on. In a further example, the vector data may appear in storage in another sequence, such as right-to-left, as in, e.g., Little-Endian storage.

Each of the vector instructions described herein has a plurality of fields, and one or more of the fields may have a subscript number associated therewith. The subscript number associated with a field of the instruction denotes the operand to which the field applies. For instance, the subscript number 1 associated with register $R_1$ denotes that the register specified in $R_1$ includes the first operand, and so forth. A register operand is one register in length, which for a vector register is, for instance, 128 bits, and for a general purpose register (GPR) is, for instance, 64 bits.

A vector instruction used in accordance with one or more aspects is a compare instruction, referred to herein as a Vector Compare Equal to Unsigned Byte (vcmpequb) instruction. This instruction is used to compare two strings. When comparing two strings, it is common to search for the first matching pair of characters or the first non-matching pair of characters. A traditional vector compare instruction compares two vectors, character (element) by character (element), for a specified predicate. For each pair of elements that is compared, the compare operation produces a result of all 0s for that element pair if the predicate compares false, or all 1s for that element pair if the predicate compares true. In one example, the predicate is "equal" when searching for the first matching character pair, or "not equal" when searching for the first non-matching character pair. Other predicates are possible, including, but not limited to, greater than, less than, etc.

Figure 4:
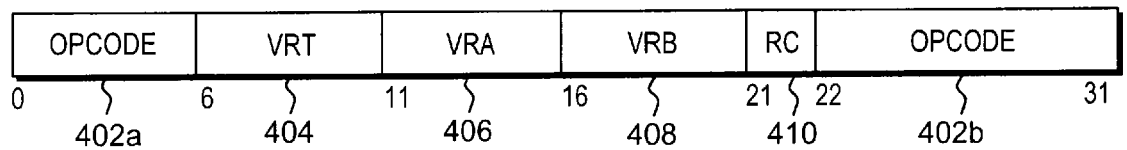
FIG. 4 depicts one example of a compare instruction, referred to as a Vector Compare Equal to Unsigned Byte instruction.

One implementation of the Vector Compare Equal To Unsigned Byte instruction is described with reference to FIG. 4. Referring to FIG. 4, in one example, a Vector Compare Equal to Unsigned Byte (vcmpequb) instruction 400 includes operation code (opcode) fields 402a (e.g., bits 0-5), 402b (e.g., bits 22-31) indicating a Vector Compare Equal to Unsigned Byte operation; a first field 404 (e.g., bits 6-10) used to designate a result vector register (VRT); a second field 406 (e.g., bits 11-15) used to designate a first source vector register (VRA) to be compared; a third field 408 (e.g., bits 16-20) used to designate a second source vector register (VRB) to be compared with the first source vector register; and a fourth field 410 (RC) (e.g., bit 21) used to enable recording a summary status in a condition register for the compare operation. Each of the fields 404-410, in one example, is separate and independent from one another; however, in other embodiments, more than one field may be combined. Further information on the use of the fields is provided below.

In operation, for each integer value i from 0 to 15 (since there are 16 byte size elements in the vectors, in this example), do the following: unsigned-integer byte element i in VRA is compared to unsigned-integer byte element i in VRB, in which the compare predicate is equal. Byte element i in VRT is set to all 1s if unsigned-integer byte element i in VRA is equal to unsigned-integer byte element i in VRB, and is set to all 0s otherwise.

In a further example, a compare not equal instruction may be provided in which each element in VRA is compared to each element in VRB, and for each pair of elements compared, all ones are placed in the corresponding element in the result register VRT for a mismatch and all zeros for a match.

Thus, in one embodiment, the compare instruction compares pair of elements and places in a result register, for each element pair, either a number of zeros or ones depending on the predicate (e.g., equal, not equal, greater than, less than, etc.) evaluating true (ones) or false (zeros), and the number of zeros or ones equals the size of the elements. Then, to determine the location of the first matching (or non-matching) element, the number of leading (or trailing) elements composed of all 0s is to be counted. Given each element of a result vector resulting from a vector compare can be assumed to be all 1s or all 0s, the operation to count the number of leading (or trailing) elements of 0s need not examine the entire element to check for 0, but instead is to only examine a selected location of each element, such as the least-significant bit (LSB). Thus, in accordance with one aspect, a count is performed of the leading (or trailing) LSBs that have a value of 0. This advantageously avoids counting all of the bits of each element and enables hardware to be able to perform this function. The count produced will be the index of the first matching or non-matching character, depending on the predicate.

Figure 5A:
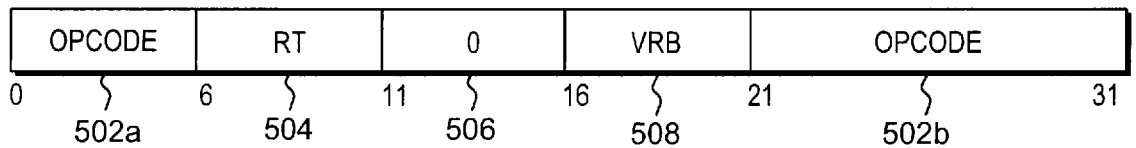
FIG. 5A depicts one example of a Vector Count Leading Zero Least Significant Bits (LSB) Byte instruction, in accordance with one or more aspects.

As one example, the counting of least significant bits having a particular value, such as zero, is performed by an instruction. One example of such an instruction is a Vector Count Leading Zero Least Significant Bits Byte instruction, an example of which is described with reference to FIG. 5A. In one example implementation in the Power Architecture, a Vector Count Leading Zero Least Significant Bits (LSB) Byte (vclzlsbb) instruction 500 includes, for instance, opcode fields 502*a* (e.g., bits 0-5), 502*b* (e.g., bits 21-31) indicating a Vector Count Leading Zero Least Significant Bits Byte operation; and a first field 504 (e.g., bits 6-10) used to designate a general purpose register (GPR) to hold the result (RT) of the compare. The instruction also includes, for instance, a second field 506 (e.g., bits 11-15) used to designate a particular value (e.g., zero) used to determine the direction of the count, either leading elements (particular value=0) or trailing elements (particular value=1). In this example, the particular value is equal to zero, and thus, leading elements are counted. This field may be considered part of the opcode, or separate therefrom. It may have a fixed value in which there are two different instructions: one for leading elements, one for trailing elements; or the field may have a selectable value, in which one instruction may be used to count leading or trailing elements depending on the selected value within the field. Further, the instruction includes, for instance, a third field 508 (e.g., bits 16-20) used to designate a vector register (VRB). Each of the fields 504-508, in one example, is separate and independent from one another; however, in other embodiments, more than one field may be combined. Further information on the use of the fields is provided below.

In operation of the vclzlsbb instruction, a variable, count, is set to the number of contiguous leading byte elements in VR[VRB] having a zero least significant bit. The value of count is placed, in one particular implementation, into GPR[RT]. One example of pseudo-code to implement this function is:

```
count =0
do while count < 16
    if (VR[VRB].byte[count].bit[7]=1) break
    count=count+1
end
GPR[RT]=EXTZ64(count)
``` where 16 is the number of elements in the vector register VRB; bit 7 is the least significant bit, in this example, since each element is one byte in size (i.e., bits 0-7); and VR[VRB].byte[count] refers to the byte in register VRB corresponding to the count. For instance, if count=0, VR[VRB].byte[count] refers to byte 0 of VRB and VR[VRB].byte[count].bit[7] refers to bit 7 of byte 0 of VRB. In this example, it is assumed that the elements of register VRB are of a byte size. However, the elements may be of different sizes, such as halfword, word, or doubleword. If so, byte would be replaced with the particular size or it can just say "element", and the LSB would be other than 7 depending on the size, and therefore, 7 may be replaced with "LSB". Thus, in one example, it may read VR[VRB].element[count].bit[LSB].

One embodiment of the logic associated with the Vector Count Leading Zero Least Significant Bits Byte instruction is further described with reference to FIG. 5B. In this example, the elements are of a byte size, but in other embodiments, they may be of different sizes, such as halfword, word, or doubleword.

Figure 5B:
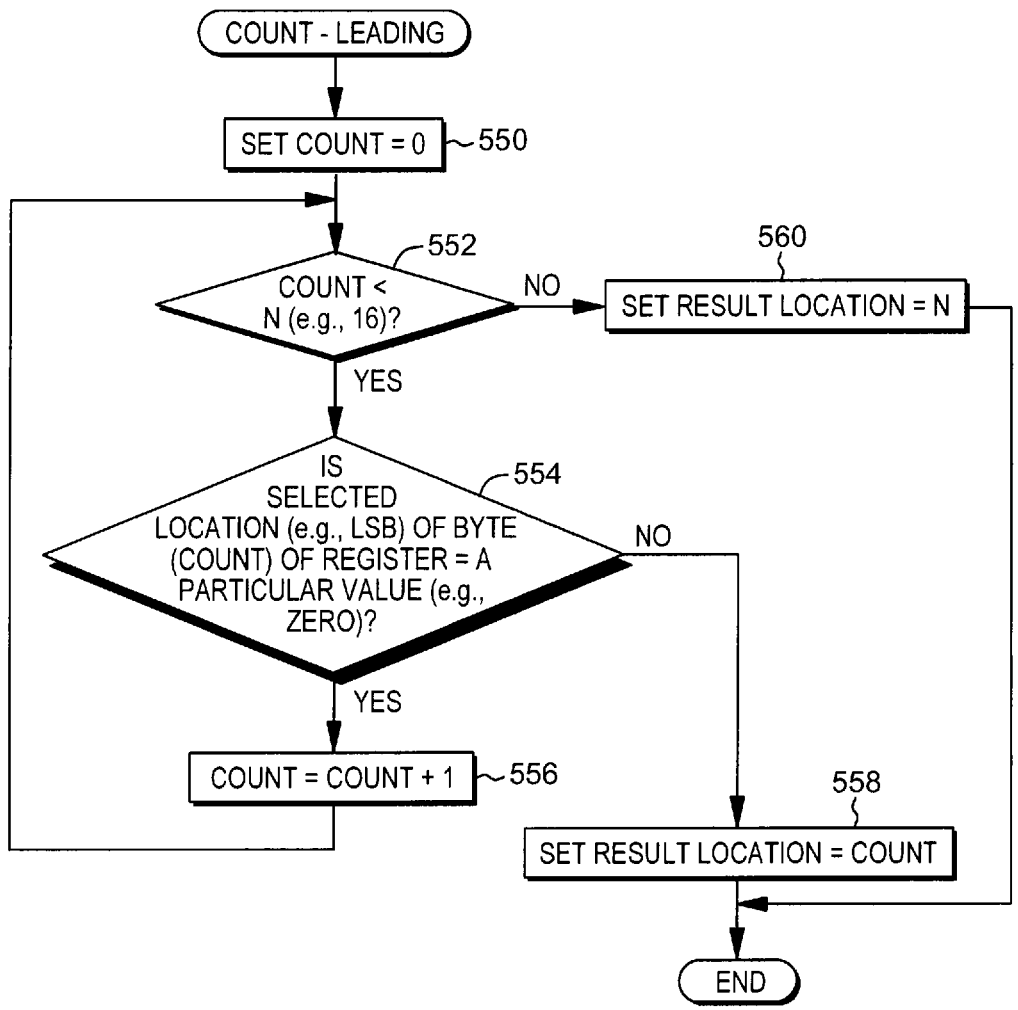
FIG. 5B depicts one embodiment of logic associated with the Vector Count Leading Zero Least Significant Bits (LSB) Byte instruction of FIG. 5A, in accordance with one or more aspects.

Referring to FIG. 5B, initially, a variable referred to as count is set equal to zero, STEP 550. Then, a determination is made as to whether count is less than N, which is the number of elements in the vector register being processed (e.g., 16), INQUIRY 552. If count is less than N, then a further determination is made as to whether a selected location (e.g., the least significant bit; e.g., bit 7, in this example, since the element size is byte) of the element designated by byte(count) of the register is equal to a particular value (e.g., zero), INQUIRY 554. For instance, a determination is made as to whether the LSB in element 0 (e.g., byte 0, in this example) has a value of zero. (In other examples, if the element size is different than byte size, then the element may be designated by element size (count), such as halfword(count), word(count), doubleword(count), etc.). If, in this example, the least significant bit of element 0 is equal to zero, then count is incremented by, e.g., one, STEP 556, and processing continues to INQUIRY 552.

At INQUIRY 552, if count is not less than N, then a result location (e.g., the result operand of the instruction) is set equal to N, STEP 560, and processing is complete. This would indicate that there were no miscompares (assuming the predicate is not equal) in the vector register being searched, which is the output of a compare instruction.

Returning to INQUIRY 554, if the least significant bit of the element being examined is not equal to zero, then a result location (e.g., the result operand of the instruction) is set equal to count, STEP 558. This indicates the index in the vector register of the miscompare (again assuming the predicate is not equal). This ends processing.

Figure 6A:
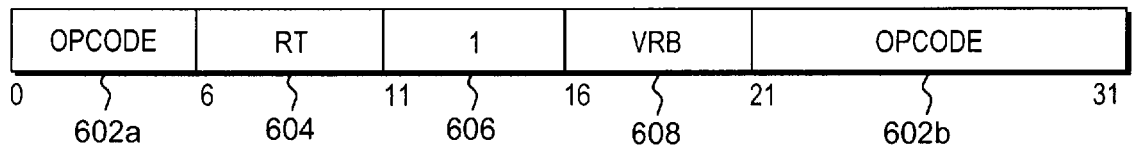
FIG. 6A depicts one example of a Vector Count Trailing Zero Least Significant Bits (LSB) Byte instruction, in accordance with one or more aspects.

In a further embodiment, the count may be of trailing zero LSB bytes, instead of leading LSB bytes. One example of a Vector Count Trailing Zero Least Significant Bits Byte instruction is described with reference to FIG. 6A. In one example implementation in the Power Architecture, a Vector Count Trailing Zero Least Significant Bits (LSB) Byte (vctzlsbb) instruction 600 includes, for instance, opcode fields 602*a* (e.g., bits 0-5), 602*b* (e.g., bits 21-31) indicating a Vector Count Trailing Zero Least Significant Bits Byte operation; a first field 604 (e.g., bits 6-10) used to designate a general purpose register (GPR) to hold the result (RT); a second field 606 (e.g., bits 11-15) used to designate a particular value (e.g., one) used to indicate trailing elements are to be counted; and a third field 608 (e.g., bits 16-20) used to designate a vector register (VRB). As described above, second field 606 may be considered part of the opcode, or separate therefrom. It may have a fixed value in which there are two different instructions: one for leading elements, one for trailing elements; or the field may have a selectable value, in which one instruction may be used to count leading or trailing elements depending on the selected value within the field. Each of the fields 604-608, in one example, is separate and independent from one another; however, in other embodiments, more than one field may be combined. Further information on the use of the fields is provided below.

In operation of the vctzlsbb instruction, a variable, count, is set to the number of contiguous trailing byte elements in VR[VRB] having a zero least significant bit. The value of count is placed into GPR[RT]. One example of pseudo-code to implement this function is:

```
count =0
do while count < 16
    if (VR[VRB].byte[15-count].bit[7]=1) break
    count=count+1
end
GPR[RT]=EXTZ64(count)
``` where 16 is the number of byte elements in the vector, VRB, in this example; bit 7 is the LSB, since the vector element size is bytes, in this example; and byte [15-count] is the element to be examined and possibly counted for a particular iteration of the loop. For instance, if count=0, VR[VRB].byte[15-count] refers to byte 15 of VRB, and VR[VRB].byte[15-count].bit[7] refers to bit 7 of byte 15 of VRB. In this example, it is assumed that the elements of register VRB are of a byte size. However, the elements may be of different sizes, such as halfword, word, or doubleword. If so, byte would be replaced with the particular size or it can just say "element" and the LSB would be other than 7 depending on the size, and therefore, 7 may be replaced with "LSB", as described above.

One embodiment of the logic associated with the Vector Count Trailing Zero Least Significant Bits Byte instruction is further described with reference to FIG. 6B. In this example, the elements are of a byte size, but in other embodiments, they may be of different sizes, such as halfword, word, or doubleword, as examples.

Figure 6B:
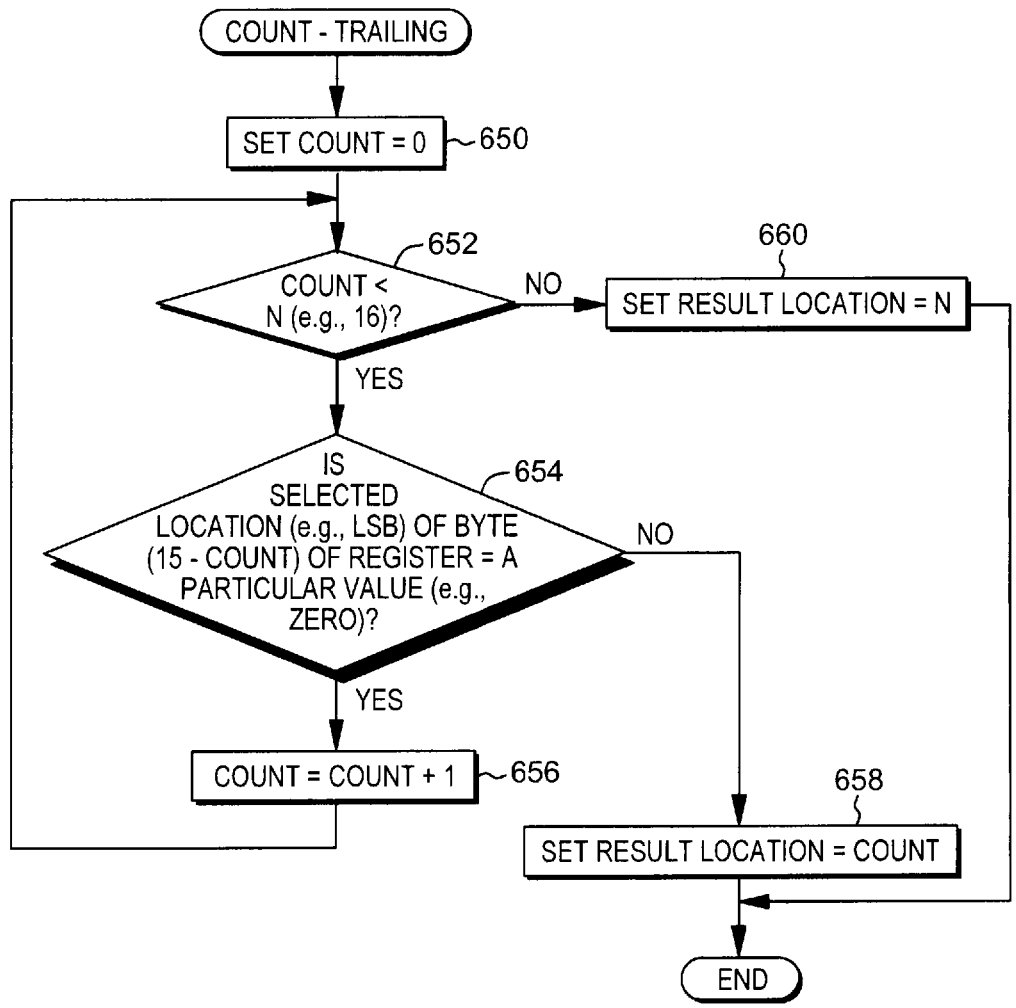
FIG. 6B depicts one embodiment of logic associated with the Vector Count Trailing Zero Least Significant Bits (LSB) Byte instruction of FIG. 6A, in accordance with one or more aspects.

Referring to FIG. 6B, initially, a variable referred to as count is set equal to zero, STEP 650. Then, a determination is made as to whether count is less than N, which is the number of elements in the vector register being processed (e.g., 16), INQUIRY 652. If count is less than N, then a further determination is made as to whether a selected location (e.g., the least significant bit; e.g., bit 7, in this example) of the element designated by byte (15-count) of the register is equal to a particular value (e.g., zero), INQUIRY 654. (In other examples, if the element size is different than byte size, then the element may be designated by element size ((# of elements-1)-count), such as halfword (7-count), word (3-count), doubleword (1-count), etc.). If, in this example, the least significant bit of element 15 is equal to zero, then count is incremented by, e.g., one, STEP 656, and processing continues to INQUIRY 652.

At INQUIRY 652, if count is not less than N, then a result location (e.g., the result operand of the instruction) is set equal to N, STEP 660, and processing is complete. This would indicate that there were no miscompares (assuming the predicate is not equal) in the vector register being searched, which is the output of a compare instruction.

Returning to INQUIRY 654, if the least significant bit of the element being examined is not equal to zero, then a result location (e.g., the result operand of the instruction) is set equal to count, STEP 658. This indicates the index in the vector register of the miscompare (again assuming the predicate is not equal). This ends processing.

Although the example implementations described above are for the Power Architecture, the vector count leading/trailing zero least significant bits instructions may be implemented in other architectures. For instance, the operations may be implemented in the z/Architecture. Examples of these instructions in the z/Architecture are described with reference to FIGS. 7A-7B and 8A-8B.

Figure 7A:
FIG. 7A depicts another example of a Vector Count Leading Zero Least Significant Bits (LSB) instruction, in accordance with one or more aspects.

Referring to FIG. 7A, one example format of a Vector Count Leading Zero Least Significant Bits (vclzlsb) instruction is described. In one example implementation in the z/Architecture, a Vector Count Leading Zero Least Significant Bits (LSB) instruction 700 includes, for instance, opcode fields 702a (e.g., bits 0-7), 702b (e.g., bits 40-47) indicating a Vector Count Leading Zero Least Significant Bits operation; a first general register field ($R_1$) 704 (e.g., bits 8-11) used to designate a first general purpose register; a second general register field ($R_2$) 706 (e.g., bits 12-15) used to designate a second general purpose register; a mask field ($M_3$) 708 (e.g., bits 32-35) used to designate a mask; and a RXB field 710 (e.g., bits 36-39) used to indicate the most-significant bit for each of the operand fields used by the instruction (i.e., doubles the number of registers). Each of the fields 704-710, in one example, is separate and independent from one another; however, in other embodiments, more than one field may be combined. Further information on the use of the fields is provided further below.

To further explain the RXB field, this field, referred to as the register extension bit or RXB, includes the most-significant bit for each of the register designated operands. Bits for register designations not specified by the instruction are to be reserved and set to zero.

In one example, the RXB field includes four bits (e.g., bits 0-3), and the bits are defined, as follows:

0—Most-significant bit for the first register designation of the instruction.

1—Most-significant bit for the second register designation of the instruction, if any.

2—Most-significant bit for the third register designation of the instruction, if any.

3—Most-significant bit for the fourth register designation of the instruction, if any.

Each bit is set to zero or one by, for instance, the assembler depending on the register number. For instance, for registers 0-15, the bit is set to 0; for registers 16-31, the bit is set to 1, etc.

In one embodiment, each RXB bit is an extension bit for a particular location in an instruction that includes one or more vector registers. For instance, in one or more vector instructions, bit 0 of RXB is an extension bit for location 8-11, which is assigned to e.g., $R_1$; bit 1 of RXB is an extension bit for location 12-15, which is assigned to, e.g., $R_2$; and so forth.

In a further embodiment, the RXB field includes additional bits, and more than one bit is used as an extension for each vector or location.

Figure 7B:
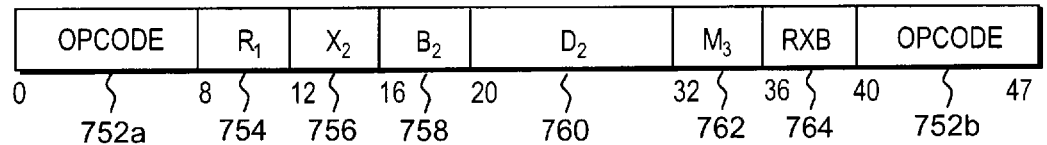
FIG. 7B depicts yet another example of a Vector Count Leading Zero Least Significant Bits (LSB) instruction, in accordance with one or more aspects.

Another example of a Vector Count Leading Zero Least Significant Bits instruction is described with reference to FIG. 7B. In one example implementation in the z/Architecture, a Vector Count Leading Zero Least Significant Bits (LSB) instruction 750 includes, for instance, opcode fields 752*a* (e.g., bits 0-7), 752*b* (e.g., bits 40-47) indicating a Vector Count Leading Zero Least Significant Bits operation; a first general register field ($R_1$) 754 (e.g., bits 8-11) used to designate a first general purpose register; an index field ($X_2$) 756 (e.g., bits 12-15) used to designate an index register; a base field ($B_2$) 758 (e.g., bits 16-19) used to designate a base register; a displacement field ($D_2$) 760 (e.g., bits 20-31) used to designate a displacement; a mask field ($M_3$) 762 (e.g., bits 32-35) used to designate a mask; and a RXB field 764 (e.g., bits 36-39) used as described above. In one example, the contents of the registers designated by $X_2$ and $B_2$ are added to the contents of $D_2$ to provide the second operand. Each of the fields 754-764, in one example, is separate and independent from one another; however, in other embodiments, more than one field may be combined. Further information on the use of the fields is provided below.

Figure 7C:
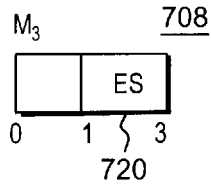
FIG. 7C depicts one example of a mask field of the instructions of FIG. 7A and FIG. 7B, in accordance with one or more aspects.

One example of $M_3$ field 708, 762 is described with reference to FIG. 7C. In one embodiment, the bits of the $M_3$ field are defined as follows:

Bit 0: Reserved

Bits 1-3: Element size control (ES) 720. Bits 1-3 specify the size of the elements in the vector registers. If a reserved value is specified, a specification exception is recognized. Examples of selectable sizes include:

000—Byte
001—Halfword
010—Word
011—Doubleword
100-111—Reserved

In operation, regardless of the implementation format, a count of the number of leading elements in the second operand (i.e., in the register identified in $R_2$, or at the location specified by adding the contents of the registers designated by $X_2$ and $B_2$ to the contents of the $D_2$ field) having a least significant bit (or other location) equal to 0 is placed into a result location (e.g., the general register designated in $R_1$). The $M_3$ field provides the ability to perform the same operation on byte, halfword, word, and doubleword element sizes. These instructions are also able to operate on a source vector operand fetched directly from storage.

Figure 8A:
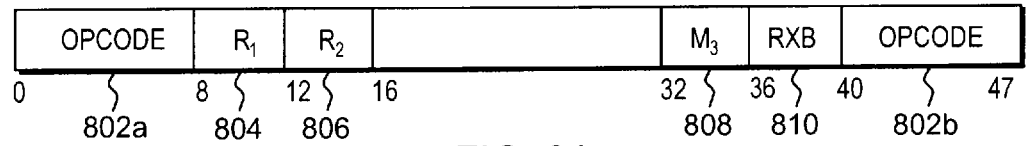
FIG. 8A depicts another example of a Vector Count Trailing Zero Least Significant Bits (LSB) instruction, in accordance with one or more aspects.
Figure 8B:
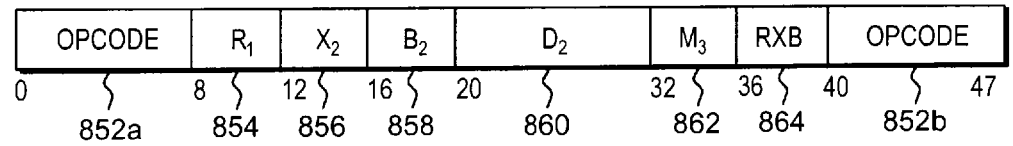
FIG. 8B depicts yet another example of a Vector Count Trailing Zero Least Significant Bits (LSB) instruction, in accordance with one or more aspects.

In other embodiments, Vector Count Trailing Zero LSB instructions are provided, as described with reference to FIGS. 8A-8B. Referring to FIG. 8A, one example of a Vector Count Trailing Zero Least Significant Bits (vctzlsb) instruction is described. In one example implementation in the z/Architecture, a Vector Count Trailing Zero Least Significant Bits (LSB) instruction 800 includes, for instance, opcode fields 802*a* (e.g., bits 0-7), 802*b* (e.g., bits 40-47) indicating a Vector Count Trailing Zero Least Significant Bits operation; a first general register field ($R_1$) 804 (e.g., bits 8-11) used to designate a first general purpose register; a second general register field ($R_2$) 806 (e.g., bits 12-15) used to designate a second general purpose register; a mask field ($M_3$) 808 (e.g., bits 32-35) used to designate a mask, where the mask indicates a selectable element size, as described with reference to FIG. 7C; and a RXB field 810 (e.g., bits 36-39) used as described above. Each of the fields 804-810, in one example, is separate and independent from one another; however, in other embodiments, more than one field may be combined. Further information on the use of the fields is provided further below.

Another example of a Vector Count Trailing Zero Least Significant Bits instruction is described with reference to FIG. 8B. In one example implementation in the z/Architecture, a Vector Count Trailing Zero Least Significant Bits (LSB) instruction 850 includes, for instance, opcode fields 852*a* (e.g., bits 0-7), 852*b* (e.g., bits 40-47) indicating a Vector Count Trailing Zero Least Significant Bits operation; a first general register field ($R_1$) 854 (e.g., bits 8-11) used to designate a first general purpose register; an index field ($X_2$) 856 (e.g., bits 12-15) used to designate an index register; a base field ($B_2$) 858 (e.g., bits 16-19) used to designate a base register; a displacement field ($D_2$) 860 (e.g., bits 20-31) used to designate a displacement; a mask field ($M_3$) 862 (e.g., bits 32-35) used to designate a mask, where the mask indicates a selectable element size, as described with reference to FIG. 7C; and a RXB field 864 (e.g., bits 36-39) used as described above. Each of the fields 854-864, in one example, is separate and independent from one another; however, in other embodiments, more than one field may be combined. Further information on the use of the fields is provided below.

In operation, regardless of the implementation format, a count of the number of trailing elements in the second operand, i.e., in the register identified in $R_2$, or at the location specified by adding the contents of the registers designated by $X_2$ and $B_2$ to the contents of the $D_2$ field, having a least significant bit equal to 0 is placed into a result location (e.g., the general register designated in $R_1$). The $M_3$ field provides the ability to perform the same operation on byte, halfword, word, and doubleword element sizes. These instructions are also able to operate on a source vector operand fetched directly from storage.

As an extension, while these instructions are defined to operate on 8-bit byte elements, providing a count of leading (or trailing) zero byte elements, shifting the result of these instructions right by 1 bit will provide a count of leading (or trailing) zero 16-bit halfword elements when used with a vector compare halfword instruction, as well as shifting the count right by two bits permit using with 32-bit word elements; and shifting right by 3 bits permits using with 64-bit doubleword elements.

Further, in other embodiments, one instruction may be used for both counting leading zeros and trailing zeros by using a field of a machine instruction to select either leading or trailing elements.

Figure 9A:
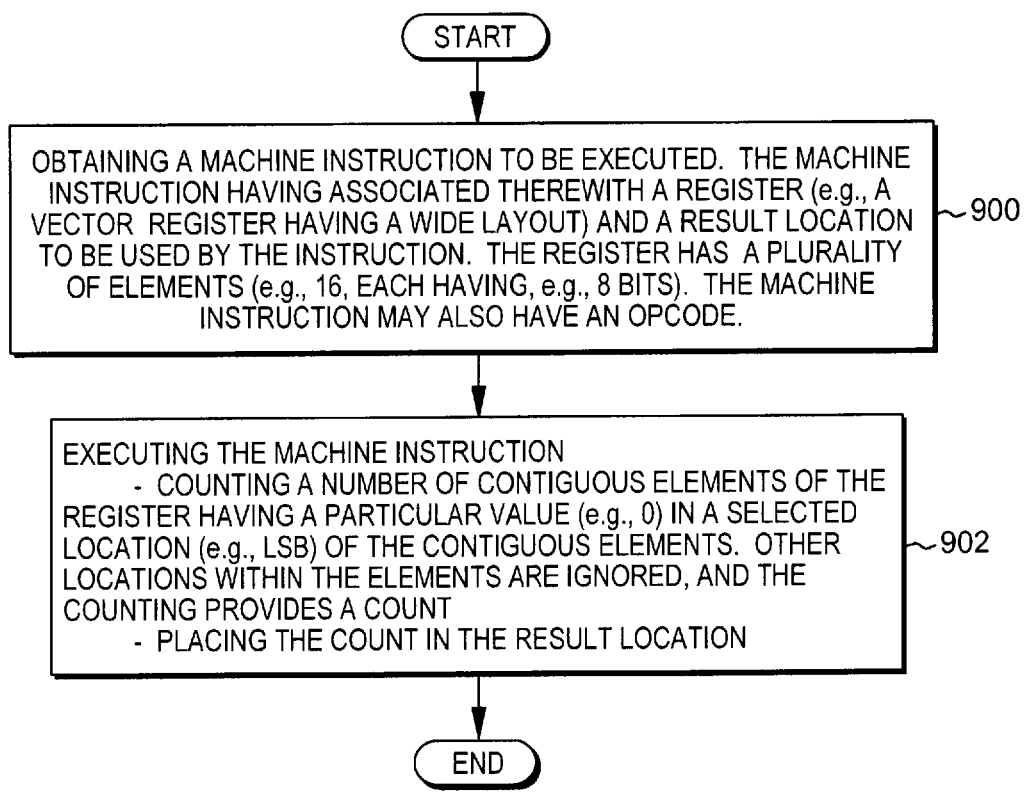
FIGS. 9A-9B depict logic to obtain and execute an instruction to count contiguous elements of a register having specific values, in accordance with one or more aspects.

As described herein, machine instructions are provided that when executed determine the location of the first occurrence (or non-occurrence) of a condition, if any, in a string or other data structure being scanned/sorted, for instance, in a SIMD vector register. One embodiment of the logic associated with executing such a machine instruction is described with reference to FIGS. 9A-9B. Referring to FIG. 9A, a machine instruction to be executed is obtained. The machine instruction has associated therewith a register (e.g., a vector register having a wide layout that has a plurality of elements (e.g., 16 elements, each having, e.g., 8 bits)), and a result location to be used by the instruction, STEP 900. The machine instruction may also have an opcode, STEP 900. The machine instruction is executed, STEP 902. The executing includes, for instance, counting a number of contiguous elements of the register having a particular value (e.g., 0) in a selected location (e.g., LSB) of the contiguous elements. Other locations within the elements are ignored, and the counting provides a count. The count is placed in the result location, STEP 902.

As examples, the result location may be a register specified by a result field of the instruction; an implied register of the instruction; a memory location; a field of the instruction; etc. Many examples exist.

Figure 9B:
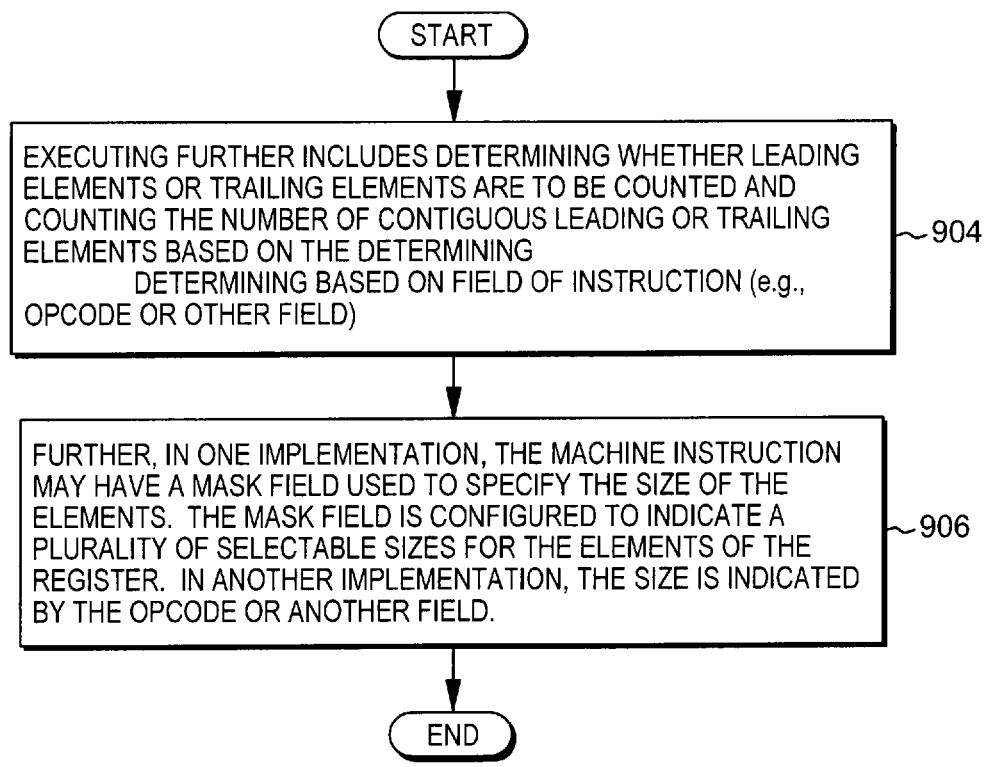

In a further embodiment, as described with reference to FIG. 9B, the executing further includes determining whether leading elements or trailing elements are to be counted, and the counting includes counting the number of contiguous leading or trailing elements based on that determining, STEP 904. The determining is based on a field of the instruction, such as the opcode field or another field.

Further, in one implementation, the machine instruction may have a mask field used to specify the size of the elements. The mask field is configured to indicate a plurality of selectable sizes for the elements of the register, STEP 906. In another implementation, the size is indicated by the opcode or another field. This advantageously allows searching and counting of various sizes of elements.

As described herein, a capability is provided to determine the location of a first occurrence (or non-occurrence) of a specific condition in a register having a wide layout, such as a vector register. Advantageously, a single bit per element is checked and potentially counted, instead of a plurality of bits per element. The count instructions provide reduced cost quadword count leading zero (clz) bits/count trailing zero (ctz) bits functions, may exploit a vector compare predicate mask (i.e., only needs to examine one bit from each element), and are useful to compute an index of the first/last match/mismatch of any vector compare.

Advantageously, the instructions may be used to test a compare result of wider data types, providing a single instruction to compute a first match/mismatch among bytes, halfwords, words, and doublewords, as examples. Thus, one or more aspects can be used in conjunction with character scanning in ASCII, EBCDIC, ISO 8859-x (1 byte character sets), Unicode (2 byte character sets), USC-4 (and expanded 5 byte Unicode-based encoding).

Other applications of one or more aspects include searching for the first element from the left (or right) that compares true (or false) for any predicate in a string or other data structure.

In one aspect, other applications include searching for the first element from the left (or right) that compares true (or false) for any predicate by using the appropriate vector compare instruction for other datatypes other than characters strings.

In yet another aspect, by pairing with a vector compare not equal instruction, a count instruction can also be used to microcode a higher-level finding matching byte/halfword/word/doubleword instruction, e.g., when executed in a merged Power/z processor core. Other possibilities also exist.

In one example, there is a need for accelerating array searches of floating point and integer numbers. This is accomplished in a similar manner described above, using the appropriate vector compare (e.g., greater than, less than, equal) for the target datatype (e.g., signed doubleword, single-precision, double-precision, etc.).

Another use of such a capability is the performing of a union and intersection of a pair of vectors of integer terms in database queries. For instance, the index of the first/last match/mismatch of any vector compare, not just strings EQ/NE, can be used to implement sorting, unions, intersections, and a variety of search operations. In this case, a vector compare less than or vector compare greater than would be used to create the predicate mask.

One or more aspects are useful for finding the index of leftmost non-matching character instructions, as well as other uses.

Further, the Vector Count Leading Zero Least Significant Bits Byte instruction may be used to locate the first occurrence of a match (or mismatch), while Vector Count Trailing Zero Least Significant Bits Byte instruction may be used to locate the last occurrence of a match (or mismatch).

Further, for a bi-endian computer system, the Vector Count Trailing Zero Least Significant Bits Byte instruction may be used to locate the first of occurrence of a match (or mismatch) in the other endian mode (i.e., Little-Endian mode when the base mode is Big-Endian). Likewise, the Vector Count Leading Zero Least Significant Bits Byte instruction may be used to locate the last occurrence of a match (or mismatch) in the other endian mode (i.e., Little-Endian mode when the base mode is Big-Endian).

As described herein, a machine instruction (e.g., a single hardware machine instruction having an architected opcode) is obtained by a processor. The machine instruction has associated therewith a register to be examined (e.g., the machine instruction includes at least one field to be used to identify a register to be examined), and a result location to be used for the machine instruction (e.g., machine instruction has a field to identify a register to store the result). The register includes a plurality of elements. The machine instruction is executed by the processor, and the executing includes counting a number of contiguous elements of the plurality of elements of the register having a particular value in a selected location within the contiguous elements. Other locations within the contiguous elements are ignored for the counting, and the counting provides a count to be placed in the result location. Advantageously, an instruction is provided that counts contiguous elements in a register having a specified value without needing to count all of the bits of the elements. This provide a more efficient, less complex design providing a count.

As one example, the count indicates a location (e.g., a first location from either the left (leading) or right (trailing)) within the register having a specific condition. One advantage of this aspect is the provision of an instruction to be used to determine the location within a register of a specific condition that is less complex and more efficient by taking advantage of the characteristic of the result of the compare producing an element of all 0s (if false) or all 1s (if true), and thereby, only having to examine one of the bits (e.g., LSB) of each element. In contrast, a true count leading zeros or count trailing zeros operation is required to count every single bit.

In one embodiment, the executing further includes determining whether leading elements of the register or trailing elements of the register are to be counted, and the counting includes counting the number of contiguous leading elements of the register or the number of contiguous trailing elements of the register based on the determining. This advantageously allows, for instance, an implementation for different types of computing environments, including Big-Endian and Little-Endian processors.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
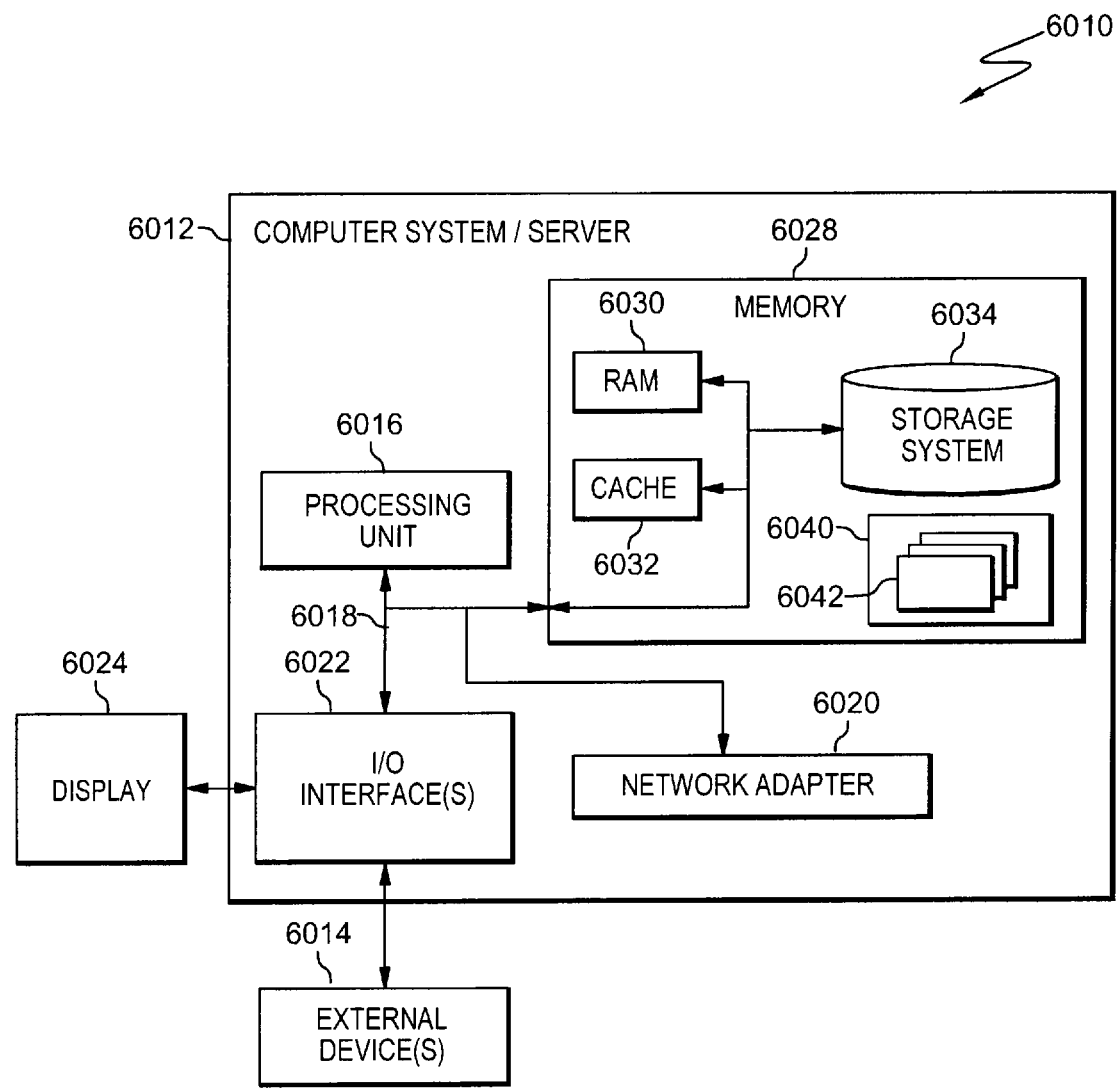
FIG. 10 depicts one example of a cloud computing node, in accordance with one or more aspects.

Referring now to FIG. 10, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 11:
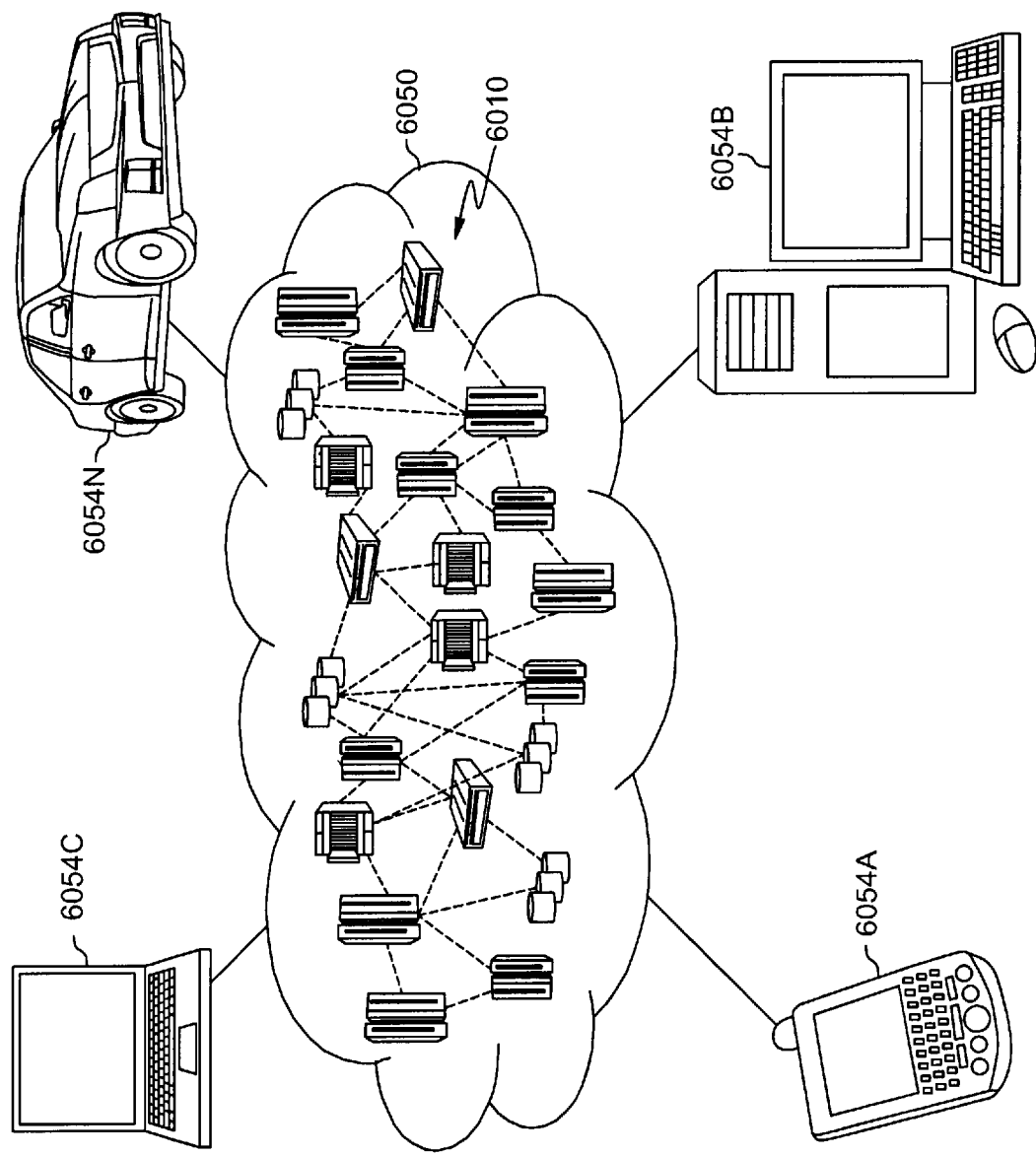
FIG. 11 depicts one embodiment of a cloud computing environment, in accordance with one or more aspects.

Referring now to FIG. 11, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 11 are intended to be illustrative only and that computing nodes 6010 and cloud computing environment 6050 can communicate with any type of computerized device over any type of network and/or network addressable connection (e.g., using a web browser).

Figure 12:
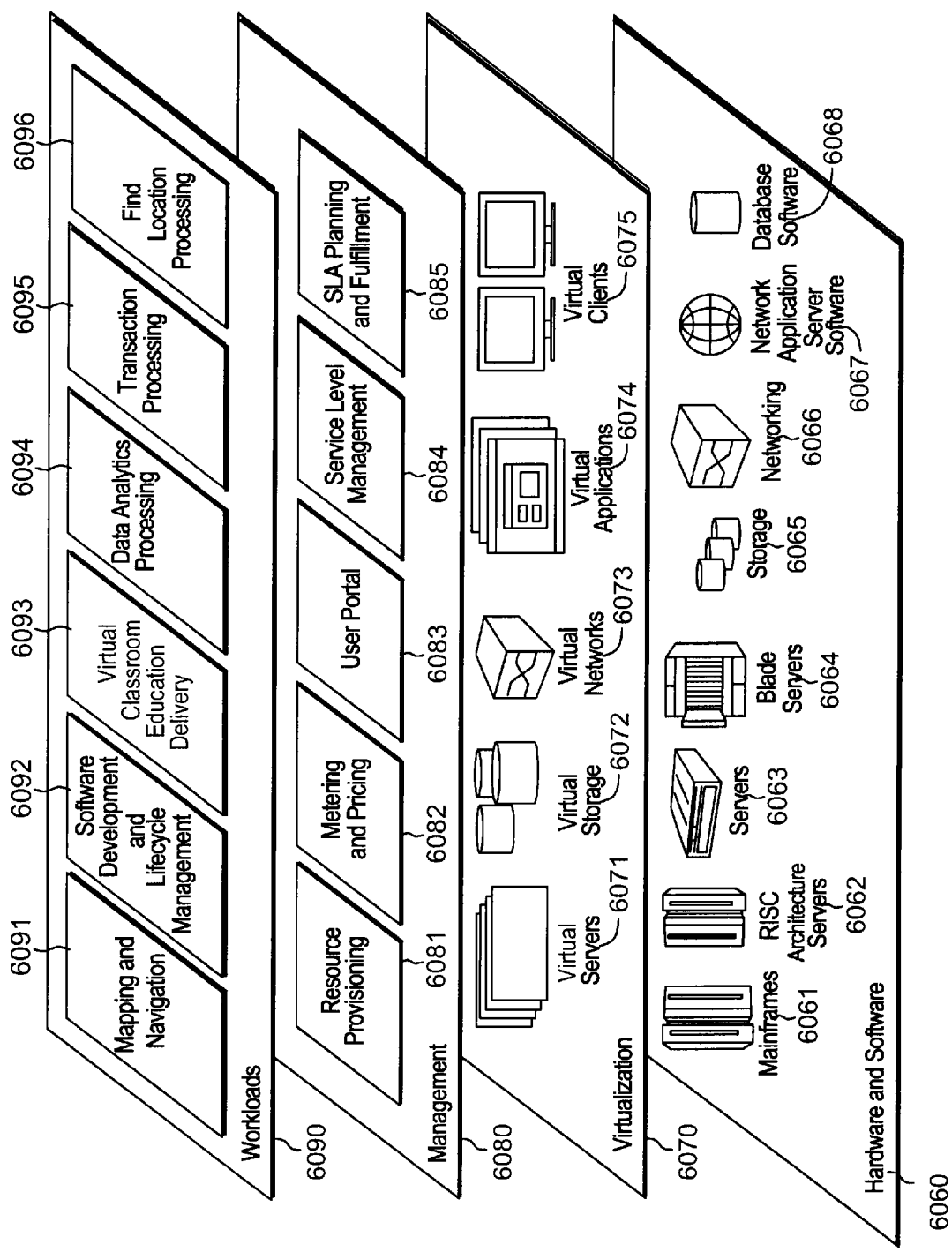
FIG. 12 depicts one example of abstraction model layers, in accordance with one or more aspects.

Referring now to FIG. 12, a set of functional abstraction layers provided by cloud computing environment 6050 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 6060 includes hardware and software components. Examples of hardware components include mainframes 6061; RISC (Reduced Instruction Set Computer) architecture based servers 6062; servers 6063; blade servers 6064; storage devices 6065; networks and networking components 6066. In some embodiments, software components include network application server software 6067 and database software 6068.

Virtualization layer 6070 provides an abstraction layer from which the following examples of virtual entities may be provided: virtual servers 6071; virtual storage 6072; virtual networks 6073, including virtual private networks; virtual applications and operating systems 6074; and virtual clients 6075.

In one example, management layer 6080 may provide the functions described below. Resource provisioning 6081 provides dynamic procurement of computing resources and other resources that are utilized to perform tasks within the cloud computing environment. Metering and Pricing 6082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 6083 provides access to the cloud computing environment for consumers and system administrators. Service level management 6084 provides cloud computing resource allocation and management such that required service levels are met. Service Level Agreement (SLA) planning and fulfillment 6085 provide pre-arrangement for, and procurement of, cloud computing resources for which a future requirement is anticipated in accordance with an SLA.

Workloads layer 6090 provides examples of functionality for which the cloud computing environment may be utilized. Examples of workloads and functions which may be provided from this layer include: mapping and navigation 6091; software development and lifecycle management 6092; virtual classroom education delivery 6093; data analytics processing 6094; transaction processing 6095; and find location processing of one or more aspects of the present invention 6096.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed.

Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product comprising:
   a non-transitory computer readable storage medium readable by a processor and storing various instructions for execution by the processor for performing a method comprising:
   obtaining, by the processor, a particular instruction to be executed, the particular instruction having associated therewith a register to be examined, a specific location within the register having a specific condition, and a result location to be used for the particular instruction for the register, the register comprising a plurality of elements; and
   executing, by the processor, the particular instruction, the executing the particular instruction comprising:
      generating a count by counting a number of contiguous elements of the plurality of elements of the register having a particular value in a selected location within the contiguous elements, wherein the specific location identifies the selected location, wherein the selected location does not comprise all locations within the contiguous elements, wherein all other locations within the contiguous elements, other than the selected location of each element within the contiguous elements, are ignored for the counting, wherein a size of an element of the plurality of elements is indicated by a field of the particular instruction, the size to be used in identifying the selected location; and
      determining if the count is less than a number of elements in the register;
   based on determining that the count is not less than the number of elements in the register, setting the result location to a first value to indicate no miscompare in the register; and
   based on determining that the count is less than the number of elements in the register, storing the count for the register in the result location as an index in the register for the miscompare.

2. The computer program product of claim 1, wherein the executing further comprises determining whether leading elements of the register or trailing elements of the register are to be counted, and wherein the counting comprises counting the number of contiguous leading elements of the register or the number of contiguous trailing elements of the register based on the determining.

3. The computer program product of claim 2, wherein the particular instruction includes an operation code to define an operation to be performed in executing the particular instruction, and wherein the determining is based on the operation code or another field of the particular instruction.

4. The computer program product of claim 1, wherein the field of the particular instruction comprises an operation code of the particular instruction used to define an operation to be performed in executing the particular instruction or another field of the particular instruction.

5. The computer program product of claim 4, wherein the other field of the particular instruction comprises a mask field, the mask field configured to indicate a plurality of selectable sizes for the plurality of elements of the register.

6. The computer program product of claim 1, wherein the selected location consists of a least significant bit of an element.

7. The computer program product of claim 1, wherein the particular value comprises zero.

8. The computer program product of claim 1, wherein the register comprises a vector register having a wide layout.

9. The computer program product of claim 8, wherein the wide layout of the vector register comprises 128 bits, the vector register has sixteen elements, each element of the sixteen elements of the vector register having eight bits, and the selected location of each element of the vector register is a least significant bit of the eight bits of that element of the vector register.

10. A system comprising:
    a memory; and
    a processor in communications with the memory, wherein the system is configured to perform a method, the method comprising:
       obtaining, by the processor, a particular instruction to be executed, the particular instruction having associated therewith a register to be examined, a specific location within the register having a specific condition, and a result location to be used for the particular instruction for the register, the register comprising a plurality of elements; and
       executing, by the processor, the particular instruction, the executing the particular instruction comprising:
          generating a count by counting a number of contiguous elements of the plurality of elements of the register having a particular value in a selected location within the contiguous elements, wherein the specific location identifies the selected location, wherein the selected location does not comprise all locations within the contiguous elements, wherein all other locations within the contiguous elements, other than the selected location of each element within the contiguous elements, are ignored for the counting, wherein a size of an element of the plurality of elements is indicated by a field of the particular instruction, the size to be used in identifying the selected location; and
          determining if the count is less than a number of elements in the register;
       based on determining that the count is not less than the number of elements in the register, setting the result location to a first value to indicate no miscompare in the register; and
       based on determining that the count is less than the number of elements in the register, storing the count for the register in the result location as an index in the register for the miscompare.

11. The system of claim 10, wherein the executing further comprises determining whether leading elements of the register or trailing elements of the register are to be counted, and wherein the counting comprises counting the number of contiguous leading elements of the register or the number of contiguous trailing elements of the register based on the determining.

12. The system of claim 11, wherein the instruction includes an operation code to define an operation to be performed in executing the instruction, and wherein the determining is based on the operation code or another field of the instruction.

13. The system of claim 10, wherein the field of the instruction comprises an operation code of the instruction used to define an operation to be performed in executing the instruction or another field of the instruction.

14. The system of claim 13, wherein the other field of the instruction comprises a mask field, the mask field configured to indicate a plurality of selectable sizes for the plurality of elements of the register.

15. The system of claim 10, wherein the selected location consists of a least significant bit of an element.

16. The system of claim 10, wherein the particular value comprises zero.

17. The system of claim 10, wherein the register comprises a vector register having a wide layout.

\* \* \* \* \*